(12) United States Patent
Stojkovic et al.

(10) Patent No.: US 9,114,835 B1
(45) Date of Patent: Aug. 25, 2015

(54) VEHICLE FRONT END STRUCTURE

(71) Applicant: FORD GLOBAL TECHNOLOGIES, LLC, Dearborn, MI (US)

(72) Inventors: Dragan B. Stojkovic, Taylor, MI (US); Gerhard G. G. Lueschen, Ypsilanti, MI (US); Darrin Neil Wagner, Bloomfield Hills, MI (US); Christopher John May, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/290,110

(22) Filed: May 29, 2014

(51) Int. Cl.
*B62D 27/02* (2006.01)
*B62D 25/08* (2006.01)

(52) U.S. Cl.
CPC .............. *B62D 27/023* (2013.01); *B62D 25/08* (2013.01)

(58) Field of Classification Search
CPC ........ B62D 25/04; B62D 25/08; B62D 27/02; B62D 27/023; B62D 27/026; B62D 29/008
USPC ............. 296/193.06, 203.01, 203.02, 203.03, 296/187.09, 187.1
See application file for complete search history.

(56) References Cited

U.S. PATENT DOCUMENTS

| | | | |
|---|---|---|---|
| 4,270,793 A | 6/1981 | Harasaki et al. | |
| 4,545,612 A | 10/1985 | Harasaki | |
| 4,883,309 A | 11/1989 | Miyazaki et al. | |
| 5,201,566 A | 4/1993 | Mori | |
| 5,624,150 A | 4/1997 | Venier | |
| 6,139,093 A | 10/2000 | Elliott et al. | |
| 6,209,950 B1 | 4/2001 | Hanyu | |
| 6,267,437 B1 | 7/2001 | Morsch et al. | |
| 6,322,134 B1 | 11/2001 | Yang | |
| 6,416,119 B1 | 7/2002 | Gericke et al. | |
| 6,679,547 B2 | 1/2004 | Ju-Sik | |
| 7,036,874 B2 | 5/2006 | Stojkovic et al. | |
| 7,066,533 B2 | 6/2006 | Sohmshetty et al. | |
| 7,090,273 B2 | 8/2006 | Stojkovic et al. | |
| 7,118,166 B2 | 10/2006 | Seksaria et al. | |
| 7,140,672 B2 | 11/2006 | Chernoff et al. | |
| 7,140,674 B2 | 11/2006 | Miyoshi et al. | |
| 7,243,986 B2 | 7/2007 | Dupuis et al. | |
| 7,267,394 B1 | 9/2007 | Mouch et al. | |
| 7,390,056 B1 | 6/2008 | Stojkovic et al. | |
| 7,574,801 B2 | 8/2009 | Lowe et al. | |
| 7,798,560 B2 | 9/2010 | Hedderly | |
| 7,871,123 B2 | 1/2011 | Stojkovic et al. | |
| 7,887,122 B2 | 2/2011 | Baccouche et al. | |
| 8,002,337 B2 | 8/2011 | Baccouche et al. | |
| 8,201,873 B2 | 6/2012 | Nishimura et al. | |
| 8,517,458 B2 | 8/2013 | Lassl et al. | |
| 8,550,545 B1 | 10/2013 | Stojkovic et al. | |
| 8,651,563 B2 | 2/2014 | Mildner et al. | |
| 8,727,428 B2 | 5/2014 | Takeuchi et al. | |

(Continued)

*Primary Examiner* — Dennis H Pedder
(74) *Attorney, Agent, or Firm* — Raymond L. Coppiellie; Brooks Kushman P.C.

(57) ABSTRACT

A vehicle front end structure includes a hinge pillar having laterally spaced first and second vertical mounting surfaces that extend in a longitudinal direction. The vehicle also includes a tubular support member having a first wall secured to the first vertical mounting surface and a second wall secured to the second vertical mounting surface. The second wall extends rearward of the first wall and is secured to the hinge pillar laterally outboard of the first wall. A notched portion through at least one horizontal wall interconnecting the first and second walls of the tubular support may operate as a buckling location of the tubular support.

17 Claims, 3 Drawing Sheets

(56) References Cited

U.S. PATENT DOCUMENTS 8,833,832 B2 9/2014 Whipps
2002/0096384 A1* 7/2002 Yoshida et al. ............... 180/298
2006/0108837 A1 5/2006 Deme et al.

* cited by examiner

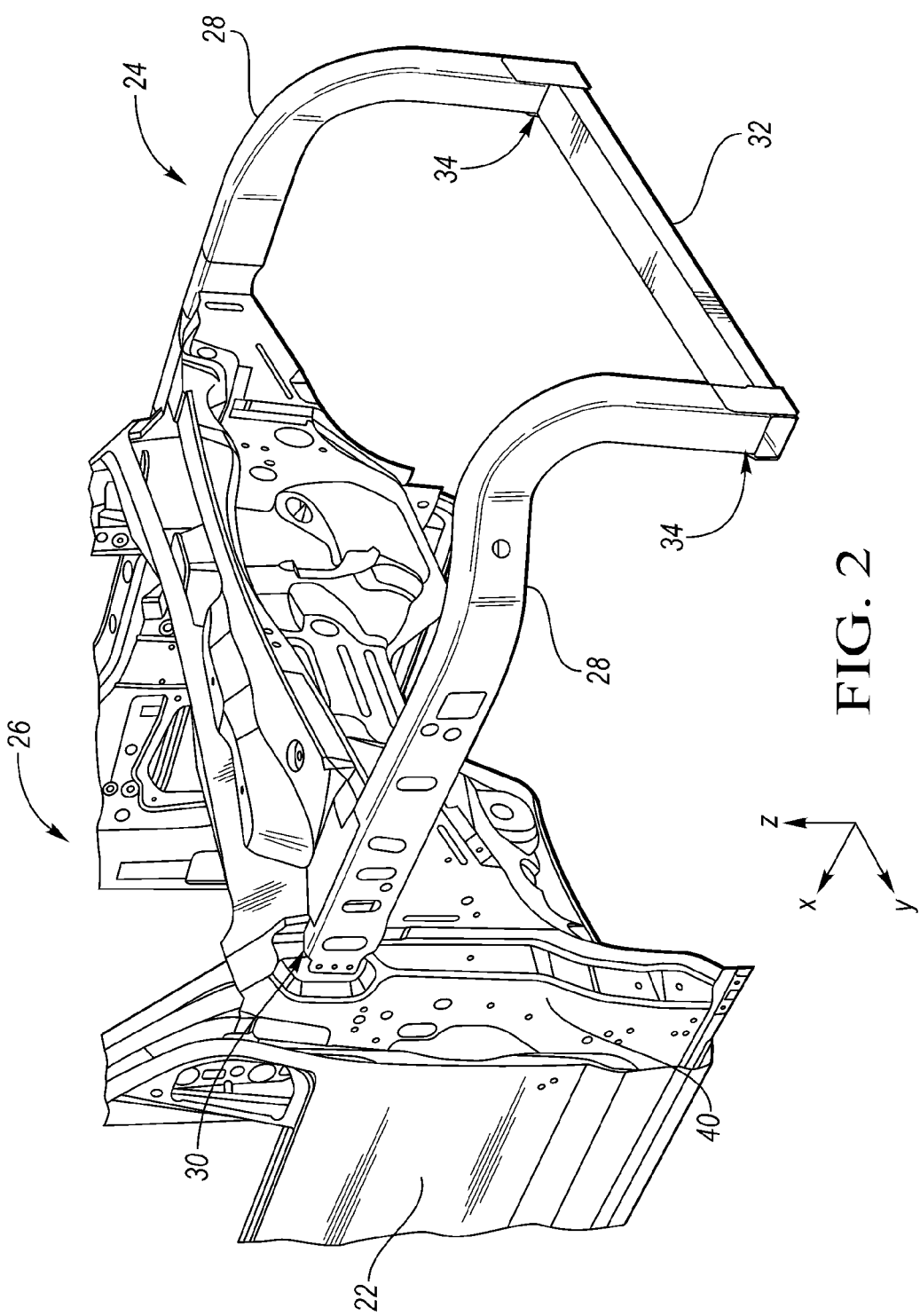

US 9,114,835 B1

VEHICLE FRONT END STRUCTURE

TECHNICAL FIELD

The present disclosure relates to a configuration for joining a tubular vehicle front end structure to a vehicle passenger cabin.

BACKGROUND

Vehicle front end structures provide mounting features for various vehicle components including body panels, hoods, and engine components for example. The front end structure may further be utilized to manage loads from vehicle impact and other sources. Particularly with the use of advanced lightweight materials, the joining method of the front structure to a vehicle cabin may have a direct relation to vehicle functional performance.

SUMMARY

According to an aspect of the present disclosure, a vehicle front end structure includes a hinge pillar having laterally spaced first and second vertical mounting surfaces that extend in a longitudinal direction. The vehicle also includes a tubular support member having a first wall secured to the first vertical mounting surface and a second wall secured to the second vertical mounting surface. The second wall extends rearward of the first wall and is secured to the hinge pillar laterally outboard of the first wall.

According to another aspect of the present disclosure, a vehicle front end structure includes a longitudinally extending tubular support. The support has first and second vertical tube walls with substantially straight portions near a rear end. The vehicle also includes a pillar having laterally facing first and second vertical surfaces. The first vertical surface is located forward and inboard relative to the location of the second vertical surface. The first tube wall of the tubular support is secured to the first vertical surface and the second tube wall is secured to the second vertical surface.

According to a further aspect of the present disclosure, a vehicle includes a tubular support having a vertical inboard wall connected by upper and lower horizontal walls to a vertical outboard wall. Each of the horizontal walls defines a notch that separates the inboard wall from the outboard wall at a rear end of the tubular support. The vehicle also includes a pillar member that defines first and second laterally facing mounting surfaces. A first fastener secures the inboard wall to the first laterally facing mounting surface, and a second fastener secures the outboard wall to the second laterally facing mounting surface. The inboard wall and the outboard wall of the tubular support may be laterally displaced relative to each other at the rear end.

According to an additional aspect of the present disclosure, the tubular support may include a notch through at least one horizontal wall that interconnects the inboard wall to the outboard wall of the tubular support. The notch may operate as a buckling location of the tubular support.

The above aspects of the disclosure and other aspects will be apparent to one of ordinary skill in the art in view of the attached drawings and the following detailed description of the illustrated embodiments.

BRIEF DESCRIPTION OF THE DRAWINGS

FIG. 2 is a front right side perspective view of a structural support of the vehicle of FIG. 1.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

A common multiple axis system is used in each of the figures to indicate relative directions with respect to the vehicle. An X-axis denotes a longitudinal direction, a Y-axis denotes a lateral direction, and a Z-axis denotes an upward direction.

Figure 1:
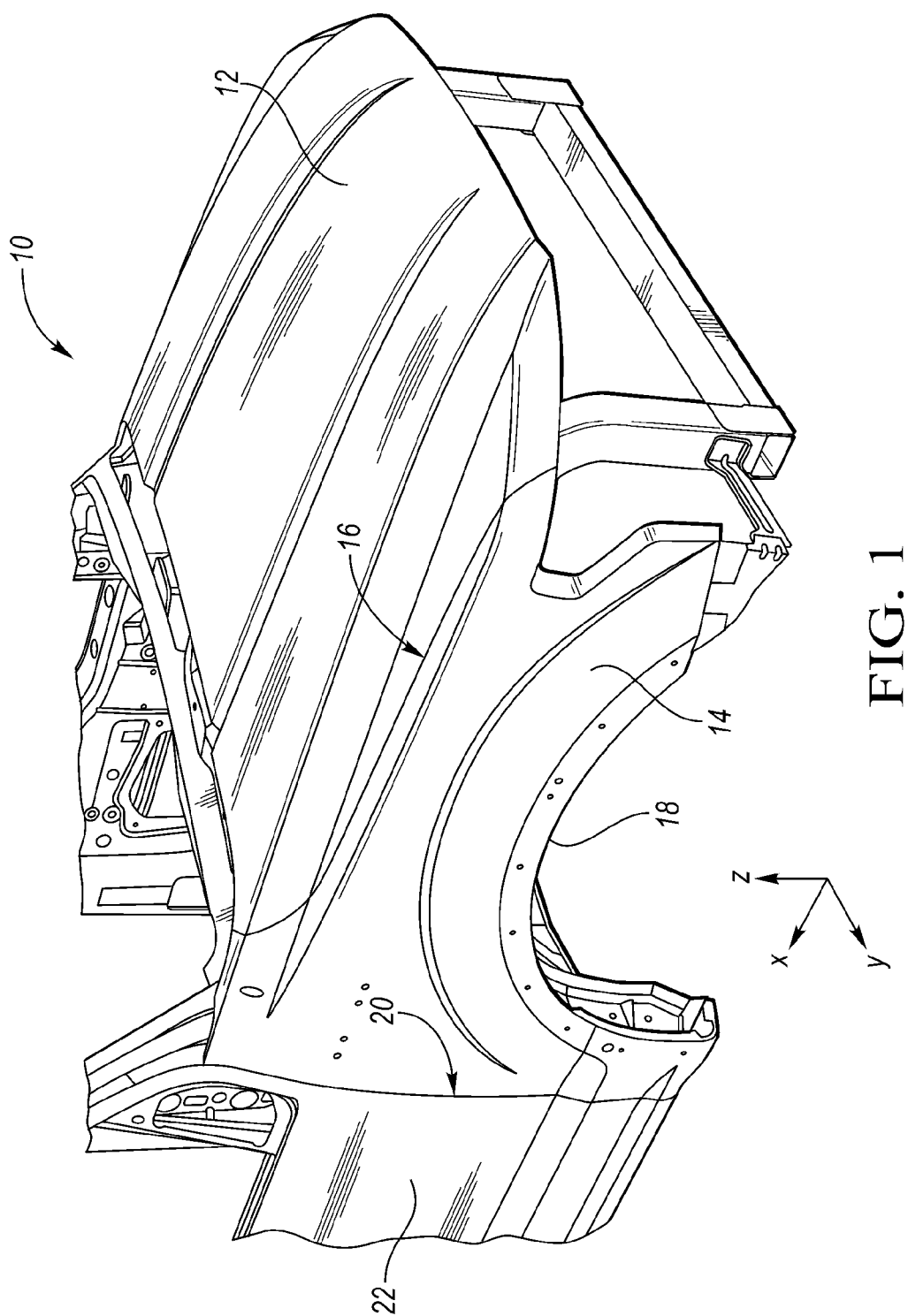
FIG. 1 is a right side front perspective view of a portion of a front end of a vehicle.

Referring to FIG. 1, a front end of a vehicle 10 is depicted that supports several outer panels. A hood 12 is hinged near a rear edge, and covers an engine compartment in a closed position. Access to the engine compartment is allowed when the hood 12 rotated to an open position. Each of a pair of fenders 14 is adjacent to the hood 12 on either side. The fenders 14 are fixed and create a margin gap 16 to the hood 12. The fenders 14 also create an interface to a front wheel well 18 at a lower portion. At a rear portion, the fenders 14 create a margin gap 20 to a side door 22. Both of the fenders 14 and the hood 12 require sufficient underlying front end structure in order to maintain proper fits relative to each other, as well as operability.

Referring to FIG. 2, a front end structure 24 extends forward from a passenger cabin 26. The front structure 24 provides mounting support for the hood 12, fenders 14, as well as other front end components. The front end structure 24 includes a pair of tubular supports 28 that extend longitudinally from the passenger cabin 26. Each tubular support 28 is formed as a hollow structure having a rear end 30 that interfaces with the pillar structure of the passenger cabin 26. The tubular support tubes may be shaped by hydroforming stock tube material for example. A forward lateral member 32 extends across the vehicle and interconnects each of the tubular supports 28 at a front end 34 of each respective tube.

The tubular supports 28 may be substantially straight in a region near the rear end 30 that attaches to the passenger cabin 26. The substantially straight portions enhance load carrying capabilities of the tubular supports 28.

In at least one embodiment the tubular support is hydroformed from a seamless aluminum tube. For example, a material such as 6011 aluminum alloy may be particularly suitable. Additionally, the wall thickness of the tubular support may be from about 2 mm to 5 mm. More specifically, the wall thickness may be about 3.1 mm. The tubular supports 28 may be also be formed of different structural materials such as steel, magnesium, titanium, polymers, composite materials, and others.

Figure 4:
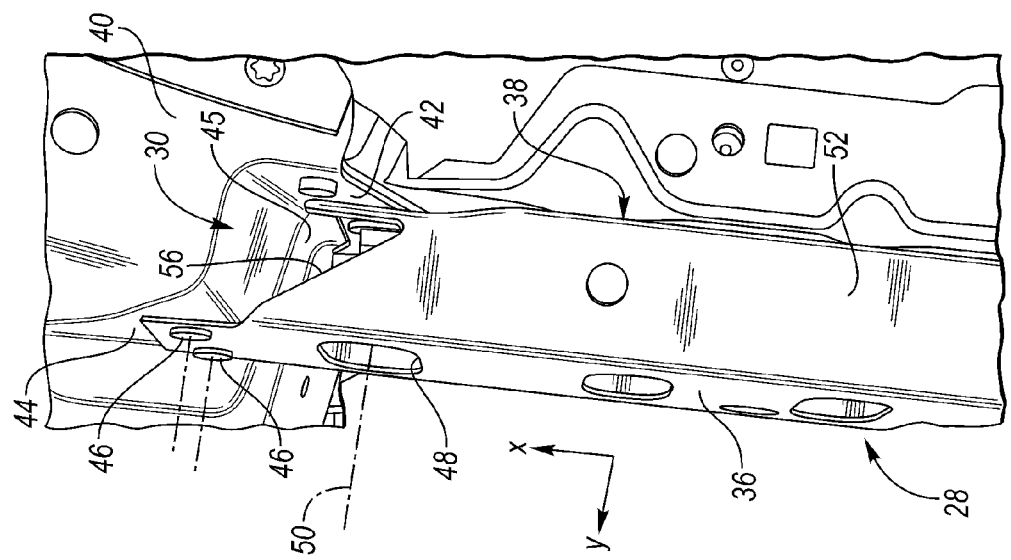
FIG. 4 is a plan view of the structural support joint of FIG. 3.
Figure 3:
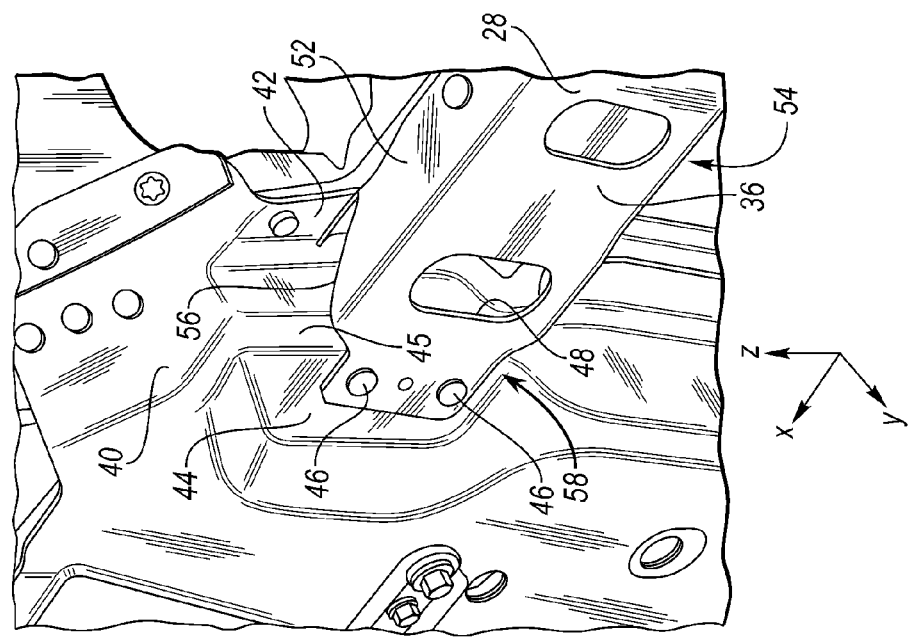
FIG. 3 is a fragmentary perspective view of a structural support joint to a front pillar.

Referring to FIGS. 3 and 4, the tubular support 28 includes a pair of laterally spaced vertical walls. An outboard wall 36 and an inboard wall 38 are generally parallel to each other, and partially define an internal cavity of the tubular support 28. The outboard wall 36 extends further rearward relative to the inboard wall 38 at the rear end 30 of the tubular support 28. The staggered position of the rear edges of the pair of vertical walls provides a dual interface to the structure of the passenger cabin 26.

The passenger cabin 26 includes a vertical hinge pillar 40 at a forward portion. The hinge pillar 40 has a shape corresponding to the staggered rear end 30 of the tubular support 28. The hinge pillar 40 also includes a plurality of laterally facing mounting surfaces at different positions to allow the tubular support 28 to nest in the corresponding shape. The hinge pillar 40 includes a first laterally facing mounting surface 42 and a second laterally facing mounting surface 44. The mounting surfaces 42, 44 extend in a longitudinal direction. A laterally extending step 45 interconnects the first and second mounting surfaces 42, 44 and provides a continuous transition surface. The first mounting surface 42 is forward and inboard relative to the second mounting surface 44.

An offset between the first and second mounting surfaces 42, 44 corresponds approximately to the spacing between the inboard wall 38 and the outboard wall 36 of the tubular support 28. The outboard wall 36 and the inboard wall 38 are assembled to the respective mounting surfaces 42, 44 of the hinge pillar 40. In at least one embodiment, the offset between the first lateral mounting surface 42 and the second lateral mounting surface 44 is about 52 mm. Additionally, the longitudinal spacing between the mating locations of the first lateral mounting surface 42 and the second lateral mounting surface 44 is about 56 mm.

At least one fastener 46 secures the tubular support 28 to the hinge pillar 40 near a rear edge of each of the pair vertical walls. A plurality of fasteners may be suitable for securing the tubular support 28 to the hinge pillar 40. For example, a combination of threaded fasteners, rivets, welds, and/or adhesive bonding may be used to join the components of the front structure 24. In at least one embodiment, a plurality of flow drilling screws is inserted through vertical walls of the tubular support 28 into the mounting surfaces of the hinge pillar 40. The flow drilling screws create threaded holes and secure the tubular support 28 to the hinge pillar 40. The use of flow drilling screws reduces the need for precise hole alignment prior to joining the components. The first lateral mounting surface 42 and the second lateral mounting surface 44 are generally parallel with respect to each other to permit relative movement between the corresponding mating surfaces of the tubular support 28 and the hinge pillar 40. The attaching holes are then created when the tubular support 28 is positioned in its final assembly location on the hinge pillar 40. This assembly sequence may allow for improved accommodation of manufacturing tolerances.

The fasteners 46 at the forward position secure the inboard vertical wall 38 to the hinge pillar 40. At least one of the fasteners 46 is inserted in alignment with a clearance hole 48 in the outboard vertical wall 36. Both of the fasteners 46 at the forward position and the fasteners 46 at the rearward position may be inserted from outside of the vehicle into the hinge pillar 40. An assembly tool may be inserted through the access hole 48 along an axis 50 that extends across the internal cavity of the tubular support 28. Alternatively, a combination of different fastener types may be used to secure the tubular support 28. In the illustrated embodiment, flow drilling screws are used at the rear location and bolts are secured to threaded nuts to attach the tubular support to the pillar structure at the forward location.

The tubular support 28 also includes a pair of horizontal walls. An upper horizontal wall 52 and a lower horizontal wall 54 interconnect the outboard wall 36 to the inboard wall 38. A substantial majority of the length of the tubular support 28 includes a closed section comprising four interconnected walls. The tubular support 28 also includes a substantially straight portion having a uniform cross section that extends forwardly from the rear end 30. The simple shape configuration of the tubular member 28 may help to reduce the tooling required to impart complex formations and bends. The straight configuration of the tubular member 28 also allows for more direct load transfer and increased part stiffness.

A load management strategy may be used to direct how energy is dissipated in response to the application of loads to the front end structure 24. The tubular support 28 generally behaves like a beam that column loads in response to axial forces in a longitudinal direction. Energy is efficiently transferred from the tubular support 28 to the hinge pillar 40.

Structural features may be provided to influence both the rate as well as the locations where energy is absorbed by the front structure 24. In at least one embodiment, the tubular support 28 defines an upper notch 56 in the upper horizontal wall 52 and a lower notch 58 the lower horizontal wall 54. The notches 56, 58 separate the outboard wall 36 from the inboard wall 38 at the attachment points. The location and developed shape of the upper notch 56 and the lower notch 58 allow for a controlled collapse of the tubular support 28 at the notched portions 56, 58 under high load conditions. The notched portions 56, 58 function to provide a targeted buckle location in the tubular support 28. In at least one embodiment, the shape of the notch creates a cantilevered relationship of the outer wall and the inner wall relative to the upper and lower horizontal walls.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A vehicle front end structure comprising:
   a hinge pillar having laterally spaced first and second vertical mounting surfaces that extend in a longitudinal direction; and
   a tubular support member having a first wall secured to the first vertical mounting surface and a second wall secured to the second vertical mounting surface, wherein the second wall extends rearward of the first wall and is secured to the hinge pillar laterally outboard of the first wall.

2. The vehicle front end structure of claim 1 wherein the tubular support member includes upper and lower horizontal walls that interconnect the first and second walls, the horizontal walls each define a notch at a rear end of the tubular, and wherein the first and second walls are secured to the hinge pillar in a cantilevered relationship to the upper and lower horizontal walls.

3. The vehicle front end structure of claim 2 wherein the notch of each of the horizontal walls of the tubular support member operates as a predetermined buckling location in response to column loading of the tubular support member.

4. The vehicle front end structure of claim 1 further comprising a plurality of fasteners, wherein each fastener protrudes inwardly into the hinge pillar through one of the first wall or the second wall, and wherein a first fastener secures the first wall to the hinge pillar at a forward position relative to a second fastener that secures the second wall at a rearward position.

5. The vehicle front end structure of claim 1 wherein the hinge pillar defines a laterally extending step disposed between the first and second vertical mounting surfaces, and wherein the step provides a continuous transition surface from a forward securing location to a rearward securing location of the tubular support member.

6. The vehicle front end structure of claim 1 wherein the tubular support member defines an access hole through the second wall in alignment with a securing location in the first wall.

7. The vehicle front end structure of claim 1 wherein the tubular support member is formed by hydroforming an aluminum tube.

8. A vehicle front end structure comprising:
a longitudinally extending tubular support having first and second vertical tube walls with substantially straight portions at a rear end; and
a pillar having laterally facing first and second vertical surfaces, the first vertical surface being forward and inboard relative to the second vertical surface, wherein the first tube wall is secured to the first vertical surface and the second tube wall is secured to the second vertical surface.

9. The vehicle front end structure of claim 8 wherein the tubular support includes a pair of horizontal walls each interconnecting the first and second tube walls, and wherein each of the horizontal walls defines a notch at the rear end such that the first and second tube walls are not connected by the horizontal walls at the rear end.

10. The vehicle front end structure of claim 9 wherein each notch of the horizontal walls is adapted to operate as a predetermined buckling location in response to column loading of the substantially straight portion of the tubular support.

11. The vehicle front end structure of claim 8 further comprising at least one threaded fastener that protrudes inwardly through at least one of the first tube wall and the second tube wall to secure the tubular support to the pillar.

12. The vehicle front end structure of claim 8 wherein the second tube wall of the tubular support defines an access hole in alignment with a securing location on the first vertical surface of the pillar.

13. A vehicle comprising:
a tubular support having a vertical inboard wall connected by upper and lower horizontal walls to a vertical outboard wall, wherein each of the horizontal walls defines a notch that separates the inboard wall from the outboard wall at a rear end of the tubular support;
a pillar member defining first and second laterally facing mounting surfaces;
a first fastener securing the inboard wall to the first laterally facing mounting surface; and
a second fastener securing the outboard wall to the second laterally facing mounting surface, wherein the inboard wall and the outboard wall of the tubular support are laterally displaced relative to each other at the rear end.

14. The vehicle of claim 13 wherein each notch of the tubular support is adapted to operate as a buckling location in response to column loading of the tubular support.

15. The vehicle of claim 13 wherein a rear edge of the inboard wall is positioned forward relative to a rear edge of the outboard wall, and wherein the first fastener is secured at a forward position and the second fastener is secured at a rearward position.

16. The vehicle of claim 13 wherein the tubular support defines an access hole through the outboard wall in alignment with the first fastener on the inboard wall.

17. The vehicle of claim 13 wherein the tubular support is formed by hydroforming an aluminum tube.

* * * * *